United States Patent
Koerner

(10) Patent No.: US 10,384,274 B2
(45) Date of Patent: Aug. 20, 2019

(54) TOOL INCLUDING DUMMY CHIP

(71) Applicant: SANDVIK INTELECTUAL PROPERTY AB, Sandviken (SE)

(72) Inventor: Ulrich Koerner, Heimsheim (DE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 0 days.

(21) Appl. No.: 15/546,739

(22) PCT Filed: Jan. 29, 2016

(86) PCT No.: PCT/EP2016/051879
§ 371 (c)(1),
(2) Date: Jul. 27, 2017

(87) PCT Pub. No.: WO2016/120426
PCT Pub. Date: Aug. 4, 2016

(65) Prior Publication Data
US 2018/0015553 A1 Jan. 18, 2018

(30) Foreign Application Priority Data
Jan. 30, 2015 (EP) .................................. 15153301

(51) Int. Cl.
*B23C 5/00* (2006.01)
(52) U.S. Cl.
CPC .......... *B23C 5/006* (2013.01); *B23B 2231/10* (2013.01); *B23B 2250/04* (2013.01); *B23B 2270/36* (2013.01); *B23C 2250/04* (2013.01); *B23C 2250/16* (2013.01)

(58) Field of Classification Search
CPC . B23B 29/022; B23B 27/002; B23B 2250/04; B23B 2250/16; B23Q 11/0032; B23Q 11/0035; B23Q 11/0039; B23C 5/003; Y10T 408/76; Y10T 409/304312
See application file for complete search history.

(56) References Cited

U.S. PATENT DOCUMENTS

| 6,270,295 B1 * | 8/2001 | Hyatt ................ B23B 29/03457 408/1 R |
|---|---|---|
| 6,409,439 B1 | 6/2002 | Riviere |
| 2003/0156401 A1 | 8/2003 | Komine et al. |
| 2006/0127197 A1 | 6/2006 | Storch et al. |
| 2006/0275090 A1 * | 12/2006 | Onozuka ............... B23B 29/022 408/143 |
| 2007/0036621 A1 * | 2/2007 | Frank ................. B23B 29/0341 408/227 |

(Continued)

FOREIGN PATENT DOCUMENTS

DE 202010012344 U1 11/2010
JP H04164555 A 6/1992
(Continued)

*Primary Examiner* — Nicole N Ramos
(74) *Attorney, Agent, or Firm* — Corinne R. Gorski

(57) ABSTRACT

A rotating tool includes a tool body having an axis of rotation and a first recess for receiving an ID chip having a first mass and a first exterior geometry. The tool includes a dummy chip receivable in the first recess and the tool is rotationally balanced with the dummy chip in the first recess, wherein after balancing the dummy chip is removed and the ID chip is insertable in the first recess.

9 Claims, 3 Drawing Sheets

(56) References Cited

U.S. PATENT DOCUMENTS

| | | | |
|---|---|---|---|
| 2007/0092347 A1* | 4/2007 | Ananolli | B23B 51/0493 |
| | | | 408/81 |
| 2009/0257838 A1* | 10/2009 | Ostermann | B23B 29/022 |
| | | | 408/143 |
| 2010/0061822 A1 | 3/2010 | Gerber | |
| 2010/0090012 A1 | 4/2010 | Moritz | |
| 2010/0156056 A1 | 6/2010 | Collingwood et al. | |
| 2011/0182679 A1* | 7/2011 | Bierl | B23B 31/026 |
| | | | 407/53 |
| 2012/0051861 A1* | 3/2012 | Rimet | B23D 77/02 |
| | | | 408/83 |
| 2013/0294855 A1* | 11/2013 | Freyermuth | B23B 29/0341 |
| | | | 408/18 |

FOREIGN PATENT DOCUMENTS

| | | |
|---|---|---|
| JP | 2000343344 A | 12/2000 |
| WO | 2012128735 A1 | 9/2012 |

* cited by examiner

TOOL INCLUDING DUMMY CHIP

RELATED APPLICATION DATA

This application is a § 371 National Stage Application of PCT International Application No. PCT/EP2016/051879 filed Jan. 29, 2016 claiming priority of EP Application No. 15153301.5, filed Jan. 30, 2015.

BACKGROUND AND SUMMARY

The present invention relates to tools of the type including ID chips. Especially, this invention relates to rotating tools, such as drilling, milling or boring tools or extension tools which are adapted to hold such tools, for use in CNC-machines in metal cutting operations.

U.S. Patent App. Pub. US2006/0127197A1 describes tools of the type having ID (identification) chips mounted thereon. Such ID chips are useful for various purposes, such as tool inventory, maintenance, and the like and permit identification of a tool without the need for visual or physical contact with identification means. ID chips are also called ID tags, and comprise a data—or information carrier and wireless transmitting means, more specifically the ID chip is arranged to electronically store data and this data is possible to read on an external unit wirelessly. Common forms of ID chips are RFID-chips, where RFID stands for radio frequency identification.

When using such rotating tools, e.g. milling or drilling or boring tools, in a metal cutting operation, the tool rotates around a rotational axis which is the center axis of the tool. It is important that the tool is properly rotationally balanced to avoid oscillating forces, which may result in vibrations, poor surface finish on the machined surface, noise and shorter tool life. Techniques for rotationally balancing tools are well known to persons skilled in the art to which the present invention pertains. Such techniques include the consideration of mass distribution of the tool, for example the compensating for imbalance by the addition of holes or cut-outs in the tool, so as to design the tool such that the center of gravity of the tool is located as close to the rotational axis as possible. Such techniques are commonly known as "balance by design", "pre-balancing" or "counter balancing".

Typically, ID chips are provided on a rotationally balanced tool by an end user, by placing the ID chip in a cavity which is located at a distance from the rotational axis. Though the ID chips have a small mass, the inventor has recognized that it can be enough to cause the tool, which is rotationally balanced without the ID chip in the cavity, to become rotationally unbalanced when the ID chip is placed in the cavity. Accordingly, it is desirable to provide a means for ensuring that a tool with an ID chip is rotationally balanced when the ID chip is installed.

Further, an ID chip is expensive because it comprises a data—or information carrier, commonly in the form of an integrated circuit or microchip, and wireless transmitting means, such as an antenna. All users of tools do not use the identification options possible by the ID chip, so it is not desirable to mount ID chips in all tools.

SUMMARY OF THE INVENTION

The rotatable tool in US2006/0127197A1 is rotationally balanced when no ID chip is mounted in one of the bores. However, it has the disadvantage that it is not rotationally balanced when an ID chip is mounted in one of the bore holes. This disadvantage is solved, or at least reduced, by the rotatable tool according to claim 1, i.e. by a rotatable tool comprising a tool body having an axis (A) of rotation and a first recess, having a first geometry, suitable for receiving an ID chip having a first mass, in that the tool comprises a dummy chip located in the first recess wherein the tool is rotationally balanced with the dummy chip in the first recess.

The tool is rotationally balanced with the dummy chip in the first recess. In other words, the center of gravity or the center of mass of the tool is aligned with, or on, the axis of rotation of the tool body with the dummy chip in the first recess. Preferably, the axis of mass inertia of the tool body coincide with the axis of rotation of the tool body.

The tool can be arranged in various ways in order to be rotationally balanced when the dummy chip is in the first recess, e.g. by comprising one or more cavities formed in an external surface of the tool body.

With the dummy chip in the first recess, the dummy chip is arranged at a constant or permanent distance from the axis of rotation of the tool body. In such a way, the tool can be rotationally balanced with the dummy chip in the first recess.

The dummy chip is preferably either a solid metal body, a solid plastic body or a combination thereof.

The dummy chip is removeable from the first recess in a non-destructive manner.

The tool according to this aspect of the present invention facilitates balancing of the tool prior to installation of an ID chip at a later stage, or by an end user, in a manner such that the tool will be balanced after installation of the ID chip. By such a tool, a manufacturer or user of tools can have a cost-effective single assortment of tool bodies without compromising on balancing properties. The dummy chip is attachable in and removable from the first recess. Such a rotatable tool is comparatively inexpensive to manufacture, because it does not comprise an ID chip. Such a rotatable tool is rotationally balanced, or at least has improved balancing properties, both when an ID chip is mounted in the first recess in the rotatable tool and when a dummy chip is mounted in the first recess. The first recess is preferably in the form of a blind hole. The first recess is preferably located at a distance from the axis of rotation. The dummy chip does not comprise any electronic information storage medium, and it does not comprise any wireless transmitting means. In other words, the dummy chip is electronic information storage medium-free, and it is wireless transmitting means-free. It is preferably made from one or two pieces of plastic and steel. It preferably does not comprise a semiconductor. It is free from any electronic storage device.

According to another embodiment the tool includes a second recess for rotationally balancing the tool while the dummy chip is in the first recess. Such a rotatable tool has improved balance properties even if the dummy chip and/or the ID chip have a density (i.e. mass per unit volume) which is lower than that of the tool body.

According to another embodiment the second recess is disposed on a geometrically opposite side of the tool from the first recess. Such a rotatable tool has improved balance properties. Such tool can also be produced in a more cost-efficient way because only two recesses are necessary if the two recesses are placed geometrically opposite each other, e.g. at an angle of 180 degrees around the axis of rotation from each other. Preferably the first and the second recesses are located at a distance from the axis of rotation.

According to another embodiment the second recess has a different geometry from the first recess. Preferably, the second recess has a volume which is smaller than the first recess. By such a recess, less volume needs to be removed from the rotatable tool.

According to another embodiment the dummy chip has the same mass as the first mass, i.e. the mass of the ID chip. Such a rotatable tool has improved balance properties. The mass of the dummy chip is less than 110% and more than 90% of the mass of the ID chip. Preferably, the mass of the dummy chip is less than 105% and more than 95% of the mass of the ID chip. A suitable mass for each of the dummy chip and the ID-chip is 0.4-1.0 g, even more preferably 0.6-0.8 g, even more preferably 0.7 g.

According to another embodiment the dummy chip has substantially the same geometry as the first geometry. This gives a reduced risk of chips or dirt from the use of the rotatable tool to adhere in this part of the tool. Preferably, the geometry of the dummy chip and the first recess, preferably a blind hole, is cylindrical. Preferably, the first recess and the dummy chip has a diameter of 9.0-11.0 mm. Preferably, the first recess and the dummy chip has a depth or height of 4.0-6.0 mm.

According to another embodiment the dummy chip is secured in the first recess by means for resisting centrifugal force of at least 1200 N. Such a rotatable tool can be used at relatively high number of revolutions per time unit while the dummy chip is kept in the first recess. Alternative suitable means for securing the dummy chip in the first recess includes a threaded connection, a bayonet connection, a press fit, a form locking and/or an adhesive bond.

According to another embodiment the dummy chip is secured in the first recess by a male fastener that mates with a female fastener provided in the tool body, wherein the dummy chip includes a female threaded portion and a male threaded portion that mates with the female threaded portion and causes part of the dummy chip to expand radially outwardly, and wherein the radially expandable part of the dummy chip is elastic. Such a rotatable tool resists centrifugal force in an advantageous way. A radially expendable part of the dummy chip gives the advantage that the first recess is covered and/or sealed, so there is less risk of damaging the first recess or less risk that debris getting stuck in the recess.

According to another embodiment the dummy chip includes an external ring around a portion of the dummy chip that is sufficiently compressible to permit the external ring to be received in an internal groove in the first recess via a snap fit. Such a rotatable tool can be made without a screw and a threaded hole. Such a rotatable tool has the advantage that the dummy chip can be removed from the first recess in a fast and easy manner.

According to another embodiment the dummy chip is received in the first recess via an interference fit. Such a rotatable tool can be made without a screw and a threaded hole. Such a rotatable tool has the advantage that the dummy chip can be removed from the first recess in a fast and easy manner.

According to another embodiment the dummy chip comprises a recess in the form of a blind hole, and a counterweight member located in the recess. In such a way, a dummy chip can be made which has a desired mass, while being able to be mounted and removed in a fast and easy manner without the need for a screw. Preferably, the blind hole of the recess of the dummy chip has an opening in the opposite direction to the opening of the first recess.

According to another embodiment the dummy chip consists of a plastic or rubber body comprising the recess and metal counterweight member. In other words, the materials used for the dummy chip is only plastic and metal. Such a dummy chip has the advantage that it is inexpensive to produce, especially if the metal used is a relatively inexpensive material such as e.g. steel. Also, this give the advantage that a dummy chip can be made with a mass within a certain range by choosing the proportions of plastic and metal. In this case, the density of the metal should be higher than that of the plastic.

According to another embodiment the tool comprises an external tapered surface, a seat for a cutting insert and an external flange, wherein the flange is located axially between the tapered surface and the insert seat, and wherein the first recess is located in the flange. Such a rotatable tool is suitable for being connected to a machine tool spindle.

According to another embodiment the rotatable tool is part of a tool kit which further comprises an ID chip wherein the ID chip and the dummy chip have the same mass. In such a way, the balancing properties are further improved.

According to another embodiment a method of adjusting or adapting a rotatable tool comprises the steps of providing a rotatable tool according to the invention and an ID chip having a first mass, removing the dummy chip from the first recess and securing the ID chip in the first recess. The dummy chip and the ID chip have the same mass. The ID chip is secured by means such as a threaded connection, a bayonet connection, a press fit, a form locking and/or an adhesive bond.

Securing the ID chip in the first recess, can alternatively be formulated as fastening the ID chip at a constant or permanent distance from the axis of rotation of the tool body.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1:
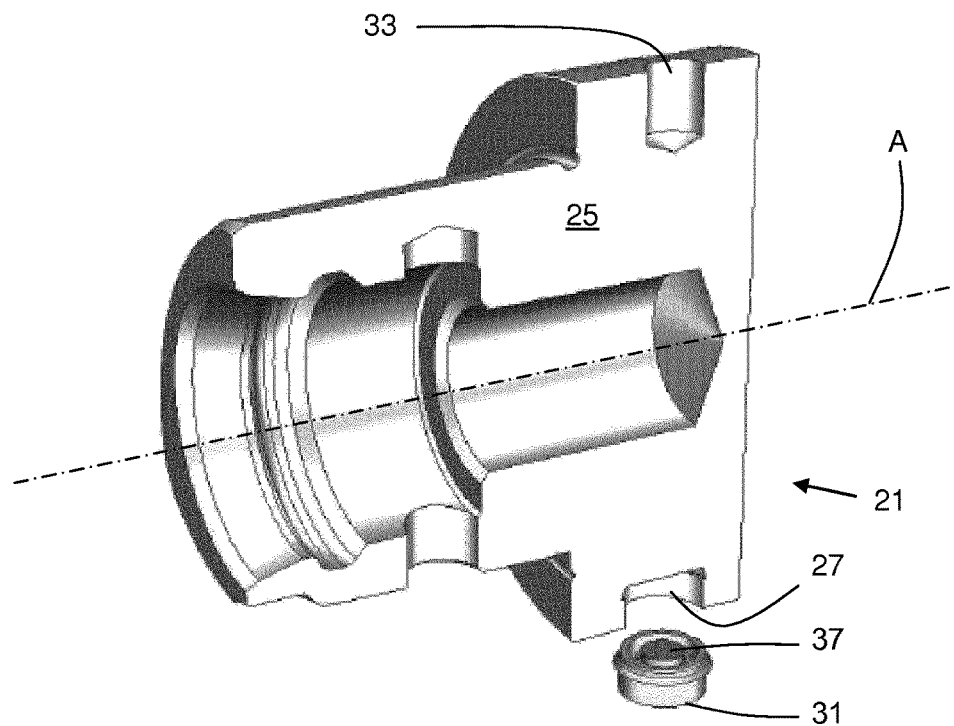
FIG. 1 is a partially cross-sectional, perspective view of a tool including a dummy chip according to an aspect of the present invention.

A rotatable tool 21 in FIG. 1 and comprises a tool body 25 having an axis A of rotation and a first recess 27 having a first exterior geometry in which a dummy chip 31 can be secured. The dummy chip 31 comprises a counterweight member 37. The counterweight member 37 is located in a recess in the dummy chip 37. The counterweight member 37 is made from steel. The dummy chip 31 comprises a radially compressible plastic body having a ridge, which permits the dummy chip 31 to be received in the first recess 27 and secured in an internal radial groove in the first recess 27. The dummy chip 31 is not capable of storing data electronically. It can have data in the form of a printed text or symbols. The tool 21 includes a second recess 33 for rotationally balancing the tool while the dummy chip 31 is in the first recess 27. The second recess 33 is disposed on a geometrically opposite side of the tool 21 from the first recess 27, centered at the same position along the axis A. The second recess 33 has a smaller volume than the first recess 27. Ordinarily the size and geometry of the second recess 33 will be selected to offset as precisely as possible an unbalance created by the dummy chip 31 and, later, the ID chip 29 in the first recess. To accomplish this, the diameter of the second recess 33 may be different from that of the first recess 27, and may include a plurality of different diameters, and the second recess may be deeper or shallower than the first recess. While reference will be made to diameters of the first and second recesses 27 and 33, it will be appreciated that the first and second recesses need not be circular, although it is presently believed that circular recesses will ordinarily be the most convenient shapes in which to form the recesses. The first recess 27 and the second recess 33 have openings perpendicular to and away from the axis A. The rotatable tool 21 comprises an external tapered surface at a rear end and an external flange. The external tapered surface and a surface of the flange perpendicular to the axis A and facing the tapered surface are contact surfaces when clamping the rotatable tool 21 in a machine tool spindle (not shown). Opposite the rear end is a front end (not shown) where at least one insert seat (not shown) is located. The first recess 27 and the second recess 33 are located in the flange. This location of the first recess 27 gives the possibility to remove the dummy chip 31 and replace it with an ID chip 29 in an easy way, even if the rotatable tool 21 is clamped in a machine tool spindle. The center of gravity of the rotatable tool 21 is located at the axis A when the dummy chip 31 is mounted in the first recess 27. The diameter of the opening of the first recess 27 is 9.5-10.5 mm. The depth of the first recess 27 is 4-5 mm.

Figure 2:
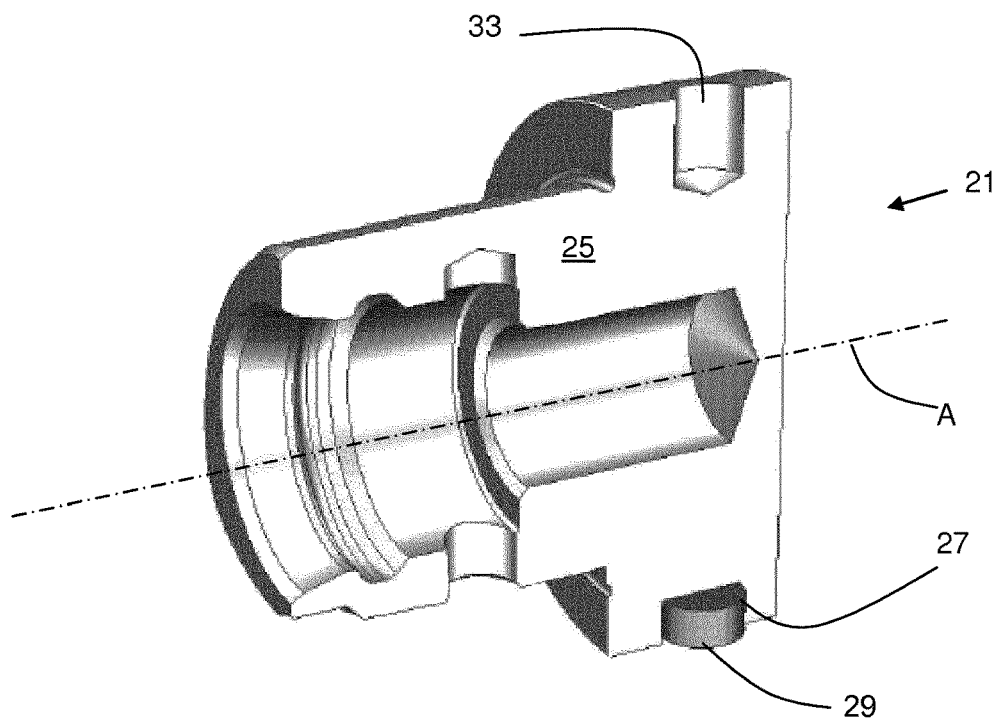
FIG. 2 is a partially cross-sectional, perspective view of a tool including a ID chip.

In the rotatable tool 21 in FIG. 2 an ID chip 29 is located in the first recess 27. In all other aspects, the rotatable tool 21 is identical to the rotatable tool in FIG. 1. The ID chip 29 is in the form of an RFID chip that can permit reading of information about, e.g., the tool without the need for visual or physical contact with the chip. One type of RFID chip saves power in an integrated circuit chip using waves of high frequency to be transmitted as a power source. It operates with the saved power as the power source. Hence, this type of RFID chip can be effectively operated without the need of a local power source such as a battery. The ID chip 29 comprises a data—or information carrier in the form of a microchip and wireless transmitting means in the form of an antenna.

Before installing the ID chip 29, the tool 21 comprises a dummy chip 31 receivable in the first recess 27 as seen in FIG. 1. The tool 21 can be rotationally balanced with the dummy chip 31 in the first recess 27. In this way, a tool manufacturer can balance a tool prior to installing the ID chip 29 that may be optionally installed in the first recess 27 by an end user so that, when the dummy chip 31 is removed and the ID chip is installed, the tool will be balanced. The dummy chip 31 can have physical characteristics that permit it to mimic the physical characteristics of the ID chip 29 so that when the dummy chip is removed and the ID chip is installed, the balance of the tool 21 will be the same. The dummy chip 31 can have the same mass as the first mass of the ID chip 29, the same geometry as the first exterior geometry, and/or can be physically substantially indistinguishable from the ID chip 29. However, the dummy chip 31 may be physically different from the ID chip 29 but have a mass distribution such that, when disposed in the first recess 27, the tool 21 is balanced substantially the same as if the ID chip 29 were in the first recess. For example, the dummy chip 31 may have a smaller mass than the ID chip 29 but may have a center of mass disposed radially outwardly of the center of mass of the ID chip so that the dummy chip will substantially mimic the effect on balance during rotation of the tool that the ID chip has when it is in the first recess. The dummy chip 31 can include a recess 35 (FIG. 6) for receiving a counterweight member 37 (FIG. 6), such as a disk having the shape and mass of an RFID chip 29 that might be included in an ID chip 29. The disk is preferably made from one single piece of one metal or other suitable material.

The dummy chip 31 will ordinarily be secured in the first recess 27 by any suitable means for resisting the centrifugal force to which the dummy chip will be subjected during rotation of the tool 21. Typically, the dummy chip 31 is secured in the first recess 27 by means capable of resisting a centrifugal force of at least 1200 N. The means for securing the dummy chip 31 in the first recess 27 may include an interference fit, i.e. the dummy chip fits into the first recess sufficiently tightly that the tight fit resists removal of the dummy chip.

Figure 3:
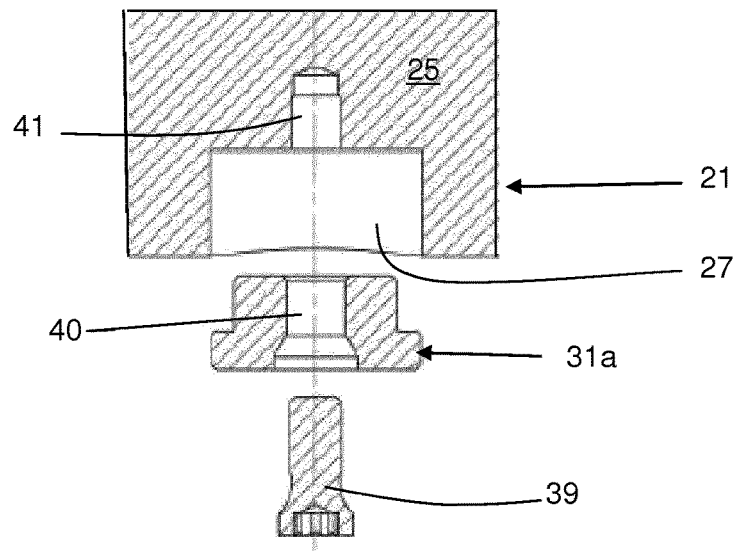
FIG. 3 is a partially cross-sectional view of a tool including a dummy chip according to another aspect of the present invention.

Means for securing the dummy chip 31*a* in the first recess 27 can include a male fastener 39 that extends through a hole 40 in the dummy chip and mates with a female fastener 41 provided in the tool body 25 as seen in FIG. 3. The male/female fastener arrangement can be in the form of a thread coupling as seen in FIG. 3 or in the form of a bayonet coupling or any other suitable means which allows the dummy chip 31 to secured in and removed from the first recess 27 in a fast and simple manner while resisting the centrifugal force (i.e. the dummy chip 31 is kept in the first recess 27) during rotation of the tool 21.

Figure 4:
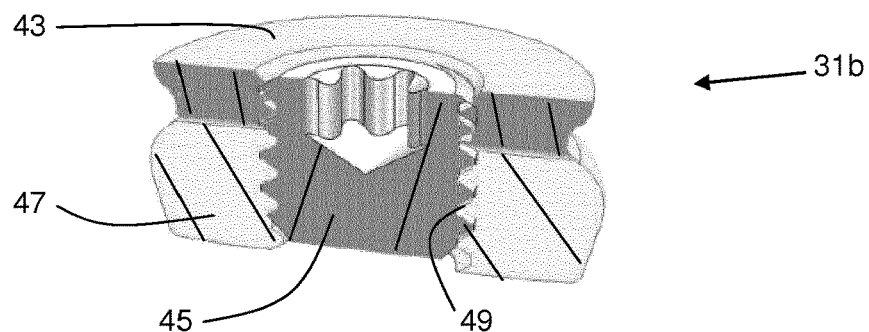
FIG. 4 is a partially cross-sectional, perspective view of a dummy chip according to an aspect of the present invention.

As seen in FIG. 4, the dummy chip 31*b* can be secured in the first recess 27 by means including a female threaded portion 43 in the dummy chip and a male threaded portion 45 that mates with the female threaded portion and causes part 47 of the dummy chip to expand radially outwardly. The male threaded portion 45 may also mate with a female threaded portion (not shown) in the tool body 25 in the manner of the male fastener 41 shown in FIG. 2. The radially expandable part 47 of the dummy chip can be elastic, such as a rubber ring or cylinder that has a smaller diameter opening 49 than the diameter of the male threaded portion and that expands radially outwardly as the male threaded portion enters the opening. The smaller diameter opening 49 may be threaded and/or deformable so that, when threads of the male threaded portion 45 enter the smaller diameter opening, the threads depress the deformable material.

Figure 5:
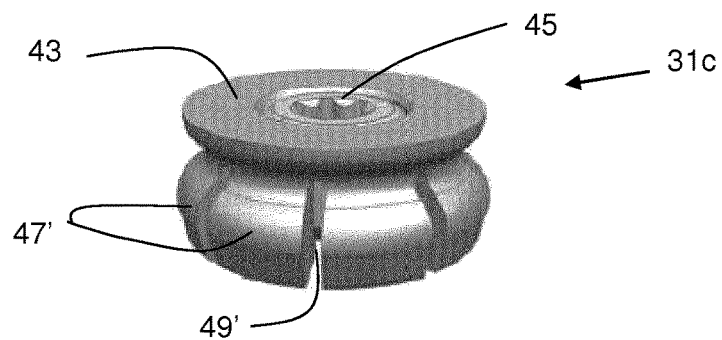
FIG. 5 is a partially cross-sectional, perspective view of a dummy chip according to another aspect of the present invention

As seen in FIG. 5, a dummy chip 31*c* can be secured in the first recess 27 by means including a female threaded portion 43 in the dummy chip and a male threaded portion 45 that mates with the female threaded portion and causes segmented parts 47' of the dummy chip to expand radially outwardly. The segmented parts 47' can be elastic or inelastic but, similar to the dummy chip 31*b*, will ordinarily define a smaller diameter opening 49' than the diameter of the male threaded portion so that the segmented parts 47' expand radially outwardly as the male threaded portion enters the opening.

Figure 6:
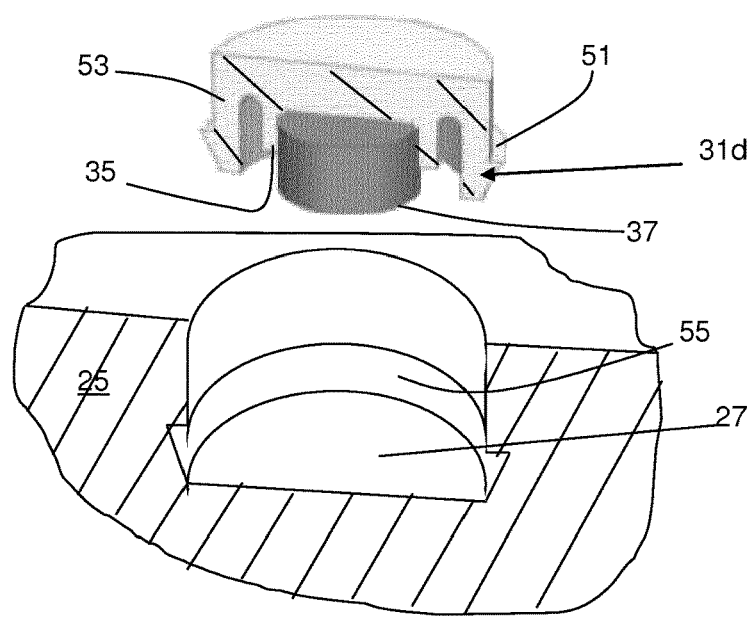
FIG. 6 is a partially cross-sectional, perspective view of a tool including a dummy chip according to another aspect of the present invention.

As seen in FIG. 6, a dummy chip 31*d* can include an external ring 51 around a portion 53 of the dummy chip that is sufficiently compressible to permit the external ring to be received in an internal groove 55 in the first recess 27 via a snap fit. The compressible portion 53 of the dummy chip 31*d* can be made of an elastic material such as rubber or a more rigid material such as a metal that is sufficiently thin and flexible that it can be flexed inwardly to permit a wider diameter ring 51 to pass through a narrower diameter portion of the first recess 27 before expanding into the groove 55. The compressible portion 53 may be in the form of a solid cylinder with a ring 51, or may be in the form of individually compressible segments with protrusions on the segments. The dummy chip 31*d* may be made from a monolithic or single piece plastic body comprising a recess 35 in which a monolithic or single piece of steel counterweight member 37 is located.

Figure 7:
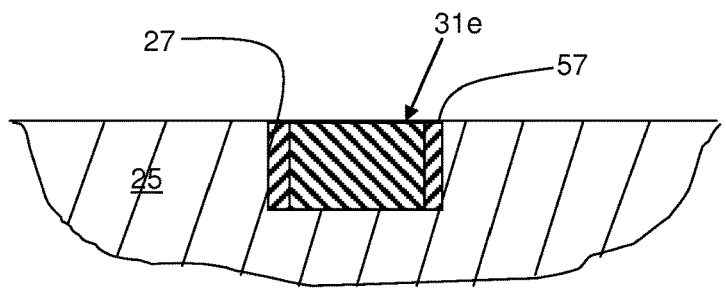
FIG. 7 is a partially cross-sectional view of a tool including a dummy chip according to another aspect of the present invention.

As seen in FIG. 7, the dummy chip 31*e* can be at least partially secured in the first recess 27 by adhesive 57. The dummy chip 31*e* can be removed by breaking or dissolving the cured adhesive.

Figure 8:
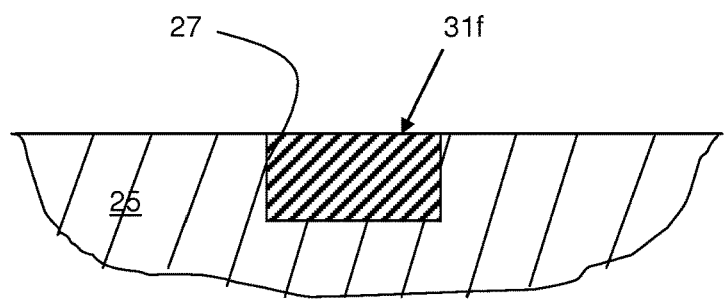
FIG. 8 is a partially cross-sectional view of a tool including a dummy chip according to another aspect of the present invention.

As seen in FIG. 8, the dummy chip 31*f* can be partially or, as illustrated, entirely cast in the first recess 27, such as in the form of a plastic cast, although other suitable materials might be used.

It will be appreciated that the use of one form of securing means does not necessarily exclude the concurrent use of others. Thus, dummy chips can, for example, be radially expandable and/or have portions such as rings or protrusions for expanding into a groove and/or be attached to the tool by a fastener and/or adhesive and/or be partially cast in the first recess.

The rear end, comprising a tapered external surface, of the rotatable tool 21 described above can be in the form of a known tool coupling such as Coromant Capto® (ISO/DIS 26623 standard) or HSK, which tool coupling also includes an external flange. The first recess 27 is preferably placed at a distance from the axis A in such a way that the first recess 27 has an opening which allows removal of the dummy chip 31 even if the rotatable tool 21 is mounted in a machine tool spindle. The first recess 27 is preferably located in the flange of the rotatable tool 21.

In a method of manufacturing a tool 21 for a rotating tool, the tool is rotationally balanced by securing a dummy chip 31 in the first recess 27. Afterward, the dummy chip 31 can be removed and the ID chip 29 specified for the tool can be installed in the first recess 27.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A tool kit comprising:
   a tool having a body with an axis of rotation and a first recess, the first recess having a first geometry arranged to receive an ID chip having a first mass;
   a solid plastic body arranged to be received in the first recess, wherein the tool is rotationally balanced with the solid plastic body disposed in the first recess;
   and an ID chip interchangeably received in the first recess with the solid plastic body after the tool is rotationally balanced, wherein the ID chip and the solid plastic body have the same mass, the solid plastic body having substantially the same geometry as the first geometry of the first recess, wherein the tool body includes an external tapered surface, a rear end, an insert seat for a cutting insert and an external flange, wherein the external flange is located axially between the tapered surface and the insert seat, the first recess being located in the flange, wherein the rear end of the tool is in the form of a tool coupling, wherein the tool coupling includes the tapered external surface and the flange.

2. The tool kit as set forth in claim 1, wherein the tool body includes a second recess for rotationally balancing the tool while the solid plastic body is disposed in the first recess.

3. The tool kit as set forth in claim 2, wherein the second recess is disposed on a geometrically opposite side of the tool from the first recess.

4. The tool kit as set forth in claim 2, wherein the second recess has a second geometry different from the first geometry of the first recess.

5. The tool kit as set forth in claim 1, wherein the solid plastic body is secured in the first recess by means for resisting a centrifugal force of at least 1200 N.

6. The tool kit as set forth in claim 1, wherein the solid plastic body is secured in the first recess by a male fastener that mates with a female fastener provided in the tool body, the solid plastic body including a female threaded portion and a male threaded portion that mates with the female threaded portion and causes part of the solid plastic body to expand radially outwardly, the radially expandable part of the solid plastic body being elastic.

7. The tool kit as set forth in claim 1, wherein the solid plastic body includes an external ring around a portion of the solid plastic body, the external ring being compressible to permit the external ring to be received in an internal groove in the first recess via a snap fit.

8. The tool as set forth in claim 1, wherein the solid plastic body is received in the first recess via an interference fit.

9. The tool as set forth in claim 1, wherein the solid plastic body includes a recess, and further comprising a counterweight member located in the recess.

\* \* \* \* \*